(12) United States Patent
Pang et al.

(10) Patent No.: US 11,570,731 B2
(45) Date of Patent: Jan. 31, 2023

(54) METHOD FOR SENDING SYNCHRONIZATION SIGNAL IN UNLICENSED FREQUENCY BAND, NETWORK DEVICE, AND TERMINAL DEVICE

(71) Applicant: HUAWEI TECHNOLOGIES CO., LTD., Guangdong (CN)

(72) Inventors: Jiyong Pang, Shanghai (CN); Jun Zhu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 122 days.

(21) Appl. No.: 16/875,132

(22) Filed: May 15, 2020

(65) Prior Publication Data

US 2020/0280939 A1 Sep. 3, 2020

Related U.S. Application Data

(63) Continuation of application No. PCT/CN2018/110602, filed on Oct. 17, 2018.

(30) Foreign Application Priority Data

Nov. 17, 2017 (CN) .......................... 201711147671.0

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0007* (2013.01); *H04W 16/14* (2013.01); *H04W 74/0808* (2013.01)

(58) Field of Classification Search
CPC .............. H04W 56/001; H04W 16/14; H04W 74/0808; H04W 48/12; H04L 5/0007; H04L 5/00; H04J 11/00
See application file for complete search history.

(56) References Cited

U.S. PATENT DOCUMENTS

2017/0223739 A1 8/2017 Mallik et al.
2018/0316454 A1* 11/2018 Damnjanovic ...... H04J 11/0086
(Continued)

FOREIGN PATENT DOCUMENTS

CN 105634859 A 6/2016
CN 106559795 A 4/2017
(Continued)

OTHER PUBLICATIONS

Huawei et al.,"NR Standalone Operation on unlicensed Bands",3GPP TSG RAN WG1 NR Ad Hoc Meeting, R1-1711469,Qingdao, China, Jun. 27-30, 2017, total 4 pages.

*Primary Examiner* — Sharmin Chowdhury
(74) *Attorney, Agent, or Firm* — Womble Bond Dickinson (US) LLP

(57) ABSTRACT

One embodiment of the invention describes a synchronization signal sending method applied to an unlicensed frequency band. To ensure transmission fairness, a network device performs listen before talk (LBT) before a start time for transmitting a synchronization signal, to determine whether a channel is busy or idle. When the channel is busy, the network device cannot transmit the synchronization signal at the expected start time for transmitting the synchronization signal. Therefore, the network device performs LBT again within a preset time length after the start time, and sends the synchronization signal when determining that the channel is idle by performing LBT again. When the channel is idle, the network device preempts a channel (Continued)

resource, and sends the synchronization signal the expected start time for transmitting the synchronization signal.

9 Claims, 7 Drawing Sheets

(51) Int. Cl.
*H04W 16/14* (2009.01)
*H04W 74/08* (2009.01)

(56) References Cited

U.S. PATENT DOCUMENTS

| | | | | |
|---|---|---|---|---|
| 2018/0343156 | A1* | 11/2018 | Malik | H04J 11/0076 |
| 2019/0053177 | A1* | 2/2019 | Niu | H04L 23/02 |
| 2019/0075596 | A1* | 3/2019 | Ye | H04L 5/0048 |
| 2020/0259588 | A1* | 8/2020 | Iyer | H04L 5/0048 |

FOREIGN PATENT DOCUMENTS

| | | | |
|---|---|---|---|
| CN | 107113886 | A | 8/2017 |
| CN | 107211281 | A | 9/2017 |
| CN | 107231643 | A | 10/2017 |
| WO | 2016072916 | A1 | 5/2016 |
| WO | 2016121917 | A1 | 8/2016 |
| WO | 2017027059 | A1 | 2/2017 |
| WO | 2017040713 | A2 | 3/2017 |

* cited by examiner

METHOD FOR SENDING SYNCHRONIZATION SIGNAL IN UNLICENSED FREQUENCY BAND, NETWORK DEVICE, AND TERMINAL DEVICE

CROSS-REFERENCE TO RELATED APPLICATIONS

This application is a continuation of International Application No. PCT/CN2018/110602, filed on Oct. 17, 2018, which claims priority to Chinese Patent Application No. 201711147671.0, filed on Nov. 17, 2017. The disclosures of the aforementioned applications are hereby incorporated by reference in their entireties.

TECHNICAL FIELD

This application relates to the field of communications technologies, and in particular, to a synchronization signal mapping method and device in an unlicensed frequency band scenario.

BACKGROUND

Rapid development of wireless communications technologies leads to an increasing shortage of licensed spectrum resources, and promotes exploration on unlicensed frequency bands. In view of this, for 3GPP, a licensed assisted access (LAA) technology is introduced to Release 13 (Release 13, R-13), and an enhanced licensed assisted access (enhanced LAA, eLAA) technology is introduced to Release 14 (Release 14, R-14). Unlicensed spectrum resources are used as far as possible through assistance of a licensed spectrum. In a 5th generation (5G) new radio (NR) system, application of an unlicensed frequency band is still a technical means for meeting a service requirement and improving user experience.

In the unlicensed frequency band, a plurality of communications systems share a frequency band. To ensure fairness, a device that performs transmission in an unlicensed spectrum usually needs to comply with a listen before talk (LBT) rule. To be specific, the device needs to listen on a channel before transmission, and can start transmission only when the channel is idle.

In the 5G NR system, synchronization signals that support a user in cell search are sent by using a combination of a plurality of blocks. To meet a requirement of the LBT rule in a scenario of an unlicensed frequency band, how to send a synchronization signal becomes an urgent problem to be resolved.

SUMMARY

Embodiments of this application provide a synchronization signal sending method applied to an unlicensed frequency band, a network device, and a terminal device, and propose a synchronization signal sending mechanism in an unlicensed frequency band scenario, to resolve the foregoing problem.

To achieve the foregoing objective, the embodiments of this application provide the following technical solutions.

According to a first aspect, this application provides a synchronization signal sending method applied to an unlicensed frequency band. To ensure transmission fairness, a network device performs listen before talk LBT before a start time for transmitting a synchronization signal, to determine whether a channel is busy or idle. When the channel is busy, the network device cannot transmit the synchronization signal at the expected start time for transmitting the synchronization signal. Therefore, the network device performs LBT again within a preset time length after the start time, and sends the synchronization signal when determining that the channel is idle by performing LBT again. When the channel is idle, the network device preempts a channel resource, and sends the synchronization signal the expected start time for transmitting the synchronization signal.

Therefore, when determining that the channel is busy through the LBT, the network device can perform LBT again within a period of delayed time, so that a synchronization signal block that fails to be sent when the channel is busy can be sent in a timely manner, to ensure access of the terminal device.

In one embodiment, the synchronization signal includes L synchronization signal blocks, the preset time length is at least one time length $T_L$ used for transmitting the synchronization signal blocks, and L is an integer greater than or equal to 2.

In one embodiment, a granularity of the preset time length is a time length $T_s$ used for transmitting one synchronization signal block. To be specific, the network device performs LBT within N $T_S$ after the start time T0 for transmitting the synchronization signal, and when the channel is idle, the network device sends l synchronization signal blocks at a time T0+N×$T_L$, where N is an integer greater than or equal to 1, l is less than or equal to L, and l is an integer greater than or equal to 1.

In one embodiment, a granularity of the preset time length is an orthogonal frequency division multiplexing OFDM symbol, the preset time length is a time length $T_{OFDM}$ occupied by at least one orthogonal frequency division multiplexing OFDM symbol.

The network device performs LBT within M $T_{OFDM}$ after the start time, and when the channel is idle, the network device sends the synchronization signal at a time T0+M×$T_{OFDM}$, where M is an integer greater than or equal to 1.

According to a second aspect, this application provides a method for receiving a synchronization signal in an unlicensed frequency band, including:

searching for and receiving, by a terminal device, a synchronization signal, where the synchronization signal includes L consecutive synchronization signal blocks, and L is an integer greater than or equal to 2; and obtaining, by the terminal device based on the found synchronization signal, system information corresponding to the network device.

According to a third aspect, this application provides a network device, including a processor and a transceiver that is connected to the processor by using a bus, where the processor is configured to control the transceiver to perform listen before talk LBT before a start time for transmitting a synchronization signal, to determine whether a channel is busy or idle; and when the channel is busy, the transceiver performs LBT within a preset time length after the start time, and sends the synchronization signal when the channel is idle; or when the channel is idle, the transceiver sends the synchronization signal at the start time.

According to a fourth aspect, an embodiment of this application provides a synchronization signal sending apparatus. The synchronization signal sending apparatus has a function of implementing the network device in the foregoing method embodiments. The function may be implemented by hardware, or may be implemented by hardware executing corresponding software. The hardware or the software includes one or more modules corresponding to the foregoing functions.

According to a fifth aspect, an embodiment of this application provides a terminal device, including a transceiver, configured to search for and receive a synchronization signal, where the synchronization signal includes L consecutive synchronization signal blocks, and L is an integer greater than or equal to 2; and a processor connected to the transceiver, configured to obtain, based on the found synchronization signal, system information corresponding to the network device.

According to a sixth aspect, an embodiment of this application provides a synchronization signal receiving apparatus. The synchronization signal receiving apparatus has a function of implementing the network device in the foregoing method embodiments. The function may be implemented by hardware, or may be implemented by hardware executing corresponding software. The hardware or the software includes one or more modules corresponding to the foregoing functions.

According to a seventh aspect, an embodiment of this application provides a computer-readable storage medium including an instruction. When the instruction runs on a computer, the computer is enabled to perform the method according to the first aspect or the second aspect.

According to an eighth aspect, a computer program product including an instruction is provided. When the computer program product runs on a computer, the computer is enabled to perform the method according to the first aspect or the second aspect.

In addition, for technical effects brought by any design manner of the second aspect to the eighth aspect, refer to technical effects brought by different design manners of the first aspect. Details are not described herein again.

These aspects or other aspects of the present invention are clearer and more comprehensible in descriptions of the following embodiments.

DESCRIPTION OF EMBODIMENTS

The following clearly and completely describes the technical solutions in the embodiments of this application with reference to the accompanying drawings in the embodiments of this application. A specific operation method in a method embodiment may also be applied to an apparatus embodiment or a system embodiment.

Figure 1:
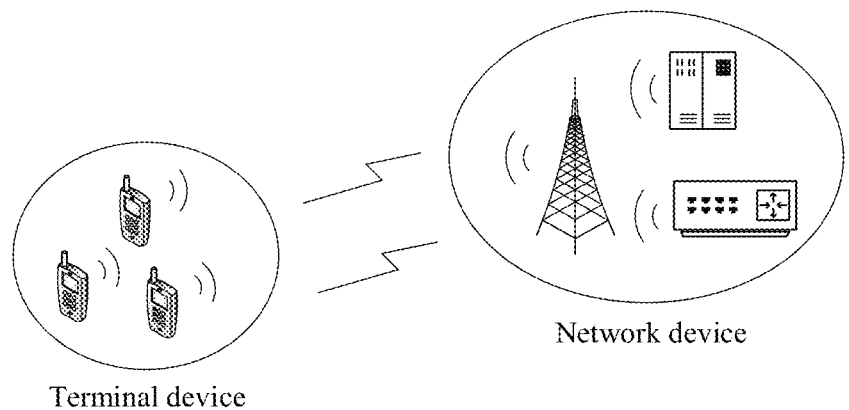
FIG. 1 is a schematic diagram of a network architecture according to an embodiment of this application.

FIG. 1 is a simplified schematic diagram of a network architecture according to an embodiment of this application. The network architecture may be a network architecture of a wireless communications system. The wireless communications system may work in a licensed frequency band or in an unlicensed frequency band. It may be understood that use of the unlicensed frequency band may increase a system capacity of the wireless communications system.

As shown in FIG. 1, the wireless communications system may include a network device and a terminal device, and the network device and the terminal device are connected by using a wireless communications technology. It should be noted that quantities and forms of the terminal device and the network device shown in FIG. 1 do not constitute a limitation on the embodiments of this application. In different implementations, one network device may be connected to one or more terminal devices. The network device may further be connected to a core network device, and the core network device is not shown in FIG. 1.

It should be noted that, the wireless communications system mentioned in the embodiments of this application includes, but is not limited to: a narrowband internet of things (NB-IoT) system, a global system for mobile communications (GSM), an enhanced data rate for GSM evolution (EDGE) system, a wideband code division multiple access (WCDMA) system, a code division multiple access 2000 (CDMA 2000) system, a time division-synchronization code division multiple access (TD-SCDMA) system, a long term evolution (LTE) system, a fifth-generation mobile communications system, and a future mobile communications system.

In this embodiment of this application, the foregoing network device is an apparatus that is deployed in a radio access network to provide a wireless communication function for a terminal device. The network device may include but is not limited to a base station (BS), a network controller, a transmission and reception point (TRP), a mobile switching center, a radio access point in Wi-Fi, or the like. For example, an apparatus directly communicating with the terminal device through a radio channel is generally a base station. The base station may include a macro base station, a micro base station, a relay station, an access point, a remote radio unit (RRU), or the like in various forms. Certainly, wireless communication with the terminal device may alternatively be performed by another network device that has a wireless communication function. This is not uniquely limited in this application. It should be noted that in different systems, a device with a base station function may have different names. For example, in an LTE network, the device is referred to as an evolved NodeB (evolved NodeB, eNB, or eNodeB); in a third generation (the 3rd Generation, 3G) network, the device is referred to as a NodeB (NodeB) or the like; and in a 5G network, the device is referred to as a gNodeB (NR NodeB, gNB).

The terminal device is also referred to as user equipment (UE), a mobile station (MS), a mobile terminal (MT), or the like, and is a device that provides a user with voice and/or data communication, for example, a handheld device, a vehicle-mounted device, a wearable device, or a computing device having a wireless connection function, or another processing device connected to a wireless modem. Currently, some examples of the terminal device are: a mobile phone (mobile phone), a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in smart grid, a wireless terminal in transportation safety, a wireless terminal in smart city, a wireless terminal in smart home, and the like.

In this application, terms "network" and "system" may be interchangeably used, and terms "user" and "terminal device" may also be interchangeably used, but meanings of the terms can be understood by a person skilled in the art. In addition, some English abbreviations in this specification are descriptions performed on the embodiments of this application by using an LTE system as an example, and the English abbreviations may change with network evolution. For specific evolution, refer to a description in a corresponding standard.

When a user accesses a network, the user needs to perform processes such as cell search, obtaining cell system information, and random access. Main purposes of the cell search are to synchronize with a cell in terms of a frequency and a symbol, obtain system frame timing, and determine a physical identifier of the cell. After completing the cell search, the user needs to obtain the system information of the cell, to know a configuration (for example, information such as a system bandwidth and a system frame number) of the cell, so as to work in the cell.

A synchronization signal block (SSB) is a signal structure, and is applicable to a communications system in 5G and later. The synchronization signal block may also be referred to as a synchronization signal/physical broadcast channel block (SS/PBCH block), or may have another name. This is not limited in this application. The synchronization signal block may usually include a primary synchronization signal (PSS), a secondary synchronization signal (SSS), and a physical broadcast channel (PBCH). The PSS and the SSS are mainly used to help UE identify the cell and synchronize with the cell. The PBCH includes most basic system information such as a system frame number or intra-frame timing information. The UE cannot access the cell unless the UE successfully receives the synchronization signal block. In a 5G new radio (NR) system, synchronization signals and broadcast channels form synchronization signal blocks (SSB) in a form of PSS-PBCH-SSS-PBCH, and the SSBs are transmitted in time domain.

Generally, synchronization signals used to support user cell search mainly include a primary synchronization signal (PSS) and a secondary synchronization signal (SSS). The cell system information is usually carried on a broadcast channel. A master information block (MIB) in the cell system information is transmitted on a physical broadcast channel (PBCH), and is used to carry specific amount of system information.

In an unlicensed frequency band application scenario, a network device or a user usually needs to comply with a listen before talk rule before performing transmission. To be specific, before sending, the network device or the user needs to first listen on a channel, for example, perform clear channel assessment (CCA). If the channel is idle, the network device or the user may perform transmission. Otherwise, the network device or the user cannot perform transmission. The CCA may be performed based on a channel energy threshold, to determine whether the channel is idle or busy. An LBT type varies with different application scenarios, and is represented as different corresponding CCA duration. For example, LBT may be classified into two types based on the CCA duration: One type is a CCA that needs to be performed for a long period of time and that is based on listening and random backoff, and may be referred to as a category 4 LBT (Cat 4 LBT); and the other type is a CCA that requires only short-time listening and does not require random backoff, may be referred to as a category 2 LBT (Cat 2 LBT), and may also be referred to as one-slot LBT. Certainly, LBT does not need to be performed before all transmissions. For example, LBT does not need to be performed before an acknowledgment (ACK) message is transmitted.

Figure 2:
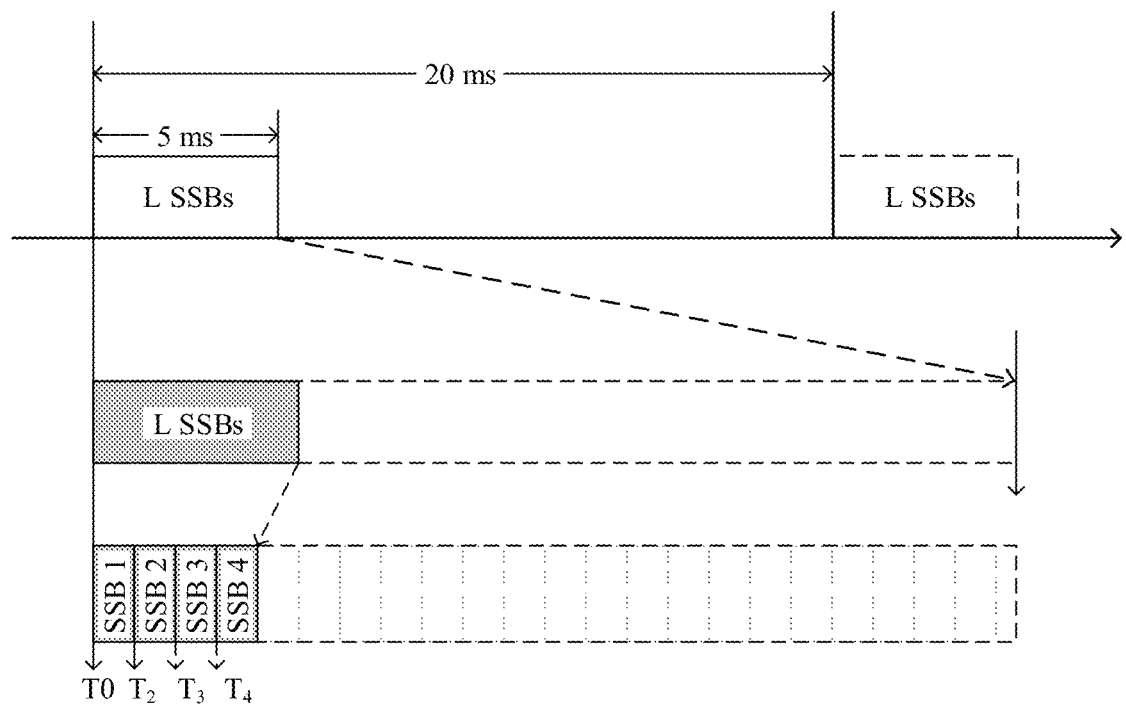
FIG. 2 is a schematic diagram of a synchronization signal block SSB according to an embodiment of this application.

Referring to FIG. 2, a synchronization signal burst set (SS burst Set) provided in an embodiment of this application may include L SSBs, and the L SSBs are continuously transmitted. In other words, no symbol interval is reserved between two neighboring SSBs, or a symbol interval between two neighboring SSBs is very small (where for example, only a minimum slot used for beam direction switching is reserved) and can be ignored. In time domain, L (for example, L=4) SSBs form a synchronization signal burst set (SS burst set). A transmission time window (namely, a maximum time span) of a synchronization signal burst set is specified, for example, may be 5 ms. A time interval between transmission start points of two neighboring SS burst sets is configurable, for example, may be configured as 20 ms, and the time interval may be referred to as a transmission cycle window. The SS burst set is usually sent at beginning of the transmission cycle window, and a next SS burst set is sent after an interval of 20 ms after the transmission start point. For ease of description, a start time of a transmission window of the SS burst set is denoted as T0. It may be understood that T0 is a reference transmission location of the first SSB. Spatial transmission directions of the L SSBs in one SS burst set may be different, and spatial transmission directions of several SSBs in one SS burst may be the same.

L is an integer greater than 1. In this embodiment, L=4 is used as an example for description. In another embodiment, a value of L may alternatively be, for example, an integer such as 3, 8, or 64. For ease of description, four SSBs are respectively represented by an SSB 1, an SSB 2, an SSB 3, and an SSB 4 in the following.

In the foregoing continuous SSB transmission mode, in a scenario in which LBT needs to be performed, when maximum occupancy time (MCOT) after a channel is successfully obtained by the network device through contention is limited, continuous SSB transmission can be performed more quickly in a same time length, and LBT does not need to be performed for a plurality of times.

When LBT of the network device succeeds before a time T0, a transmission start location of the SSB 1 is T0, and reference transmission locations of subsequent SSBs are sequentially deduced, and are respectively $T_2$, $T_3$, and $T_4$. It is assumed that a time length required for transmitting one SSB is $T_s$, and an interval between reference transmission locations of neighboring SSBs is $T_s$. Correspondingly, the terminal device searches for the SSB in the time window.

Figure 3:
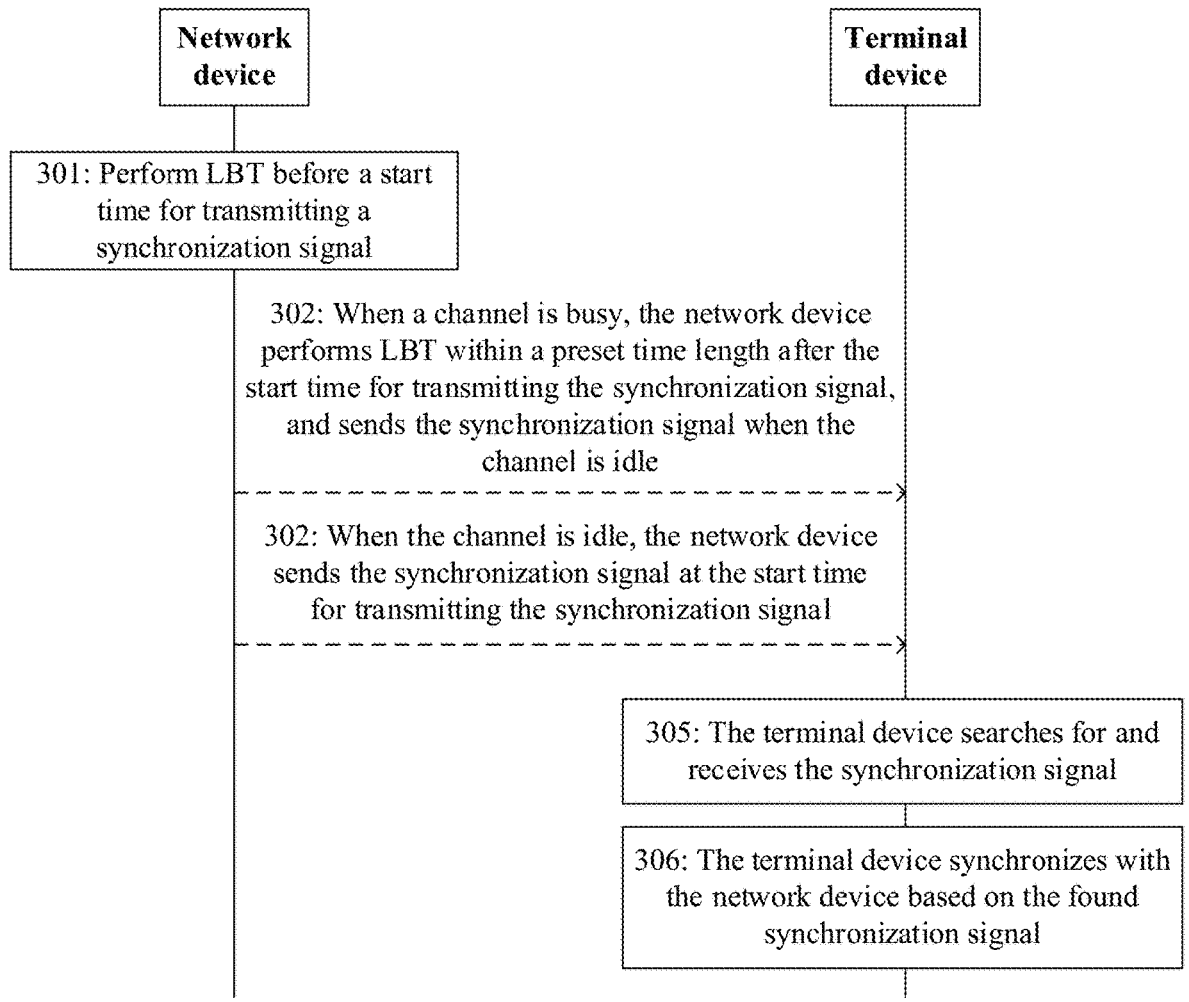
FIG. 3 is a schematic interaction flowchart of a method according to an embodiment of this application.

When the LBT fails before the time T0, the network device cannot start to transmit the SSB 1 at the expected time T0. Referring to FIG. 3, this application provides a method for sending a synchronization signal in an unlicensed frequency band. The method may be applied to the wireless communications system shown in FIG. 1, to resolve a synchronization signal sending problem in a communications system having an LBT mechanism, and avoid influence of an LBT failure on receiving an SSB by a terminal device. As shown in FIG. 3, a method for sending a synchronization signal in an embodiment of this application includes the following operations.

Operation 301: A network device performs LBT before a start time T0 for transmitting a synchronization signal.

When needing to send the synchronization signal at T0, the network device needs to perform LBT before T0 to determine whether a channel is busy or idle. For example, the network device performs channel listening by performing CCA. When it is determined that the channel is busy, operation 302 is performed. When it is determined that the channel is idle, operation 5303 is performed.

Operation 302: The network device performs LBT within a preset time length after the start time for transmitting the synchronization signal, and sends the synchronization signal when the channel is idle.

The preset time length may be defined in a standard protocol, or may be configured during system initialization. For example, a granularity of the preset time length may be a transmission time length $T_S$ of an SSB, for example, at least one $T_S$. Alternatively, a granularity of the preset time length may be a time unit of a communications system, for example, a time length occupied by one OFDM symbol.

Operation 303: The network device sends the synchronization signal at the start time for transmitting the synchronization signal.

Operation 304: A terminal device searches for and receives the synchronization signal, where the synchronization signal includes a plurality of consecutive synchronization signal blocks.

Operation 305: The terminal device synchronizes with the network device based on the found synchronization signal, and obtains system information of the network device.

When the LBT fails, at the expected time for sending the synchronization signal, the preset time length is delayed to perform LBT. If the LBT succeeds within the preset time length, the network device sends the synchronization signal. The preset time length may be accordingly configured based on a system requirement, to avoid an access failure of a terminal that is caused by an LBT failure.

The following describes the technical solutions in the embodiments of this application by using examples with reference to FIG. 4 to FIG. 14.

It is assumed that a transmission time length for transmitting an SS burst set (namely, L consecutive SSBs) is $T_L$, and a granularity of the preset time length is $T_L$. In different implementations, the transmission time length may be understood as a maximum time length for transmitting the L consecutive SSBs. To be specific, the L consecutive SSBs need to be transmitted within $T_L$, and $T_L$ is not necessarily an absolute value of a transmission time length of the L SSBs.

Figure 4:
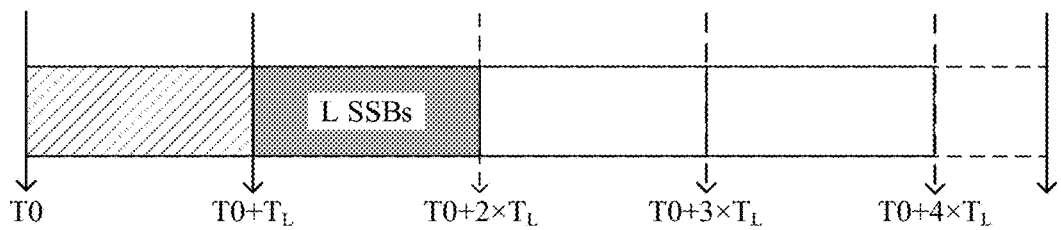
FIG. 4 is a schematic diagram of sending a synchronization signal block according to an embodiment of this application.

Referring to FIG. 4, when the network device fails in the LBT before the start time T0 of a transmission window of the synchronization signal burst set, in operation 302, the network device does not send the SS burst set within the expected transmission window, but waits and attempts to send the SSBs within a next transmission window. The network device sets a start time for retransmitting the SSBs to T0+$T_L$, that is, delays a time length $T_L$ at the time T0 to perform LBT. If the LBT succeeds before T0+$T_L$, the network device sends the synchronization signal burst set at the time T0+$T_L$. If the LBT fails before T0+$T_L$, the network device continues to delay a time length $T_L$ at a time T0+$T_L$ to perform transmission, that is, sets the start time for transmitting the SSBs to T0+2×$T_L$. By analogy, the start time that can be used for transmitting the synchronization signal burst set may alternatively be T0+3×$T_L$ or T0+4×$T_L$. It should be noted that the start time that can be used for transmitting the synchronization signal burst set is less than or equal to T0+$T_W$−$T_L$, where $T_W$ is a maximum value of the transmission window of the synchronization signal burst set, for example, 5 ms.

In another implementation, when the network device fails in LBT before a time for transmitting an $N^{th}$ SSB in the L SSBs, the network device does not send the $N^{th}$ SSB, and performs LBT before a time for transmitting an $(N+1)^{th}$ SSB. When channel listening succeeds, the network device performs LBT within N $T_L$ after the start time T0. When the channel is idle, the network device sends l synchronization signal blocks at a time T0+N× $T_L$, where N is an integer greater than or equal to 1, l is less than or equal to L, and 1 is an integer greater than or equal to 1, to send the $(N+1)^{th}$ SSB and remaining SSBs in the L SSBs. The foregoing actions are repeated until all channel listening before the L SSBs fails, or the remaining SSBs in the L SSBs are successfully sent.

Figure 5:
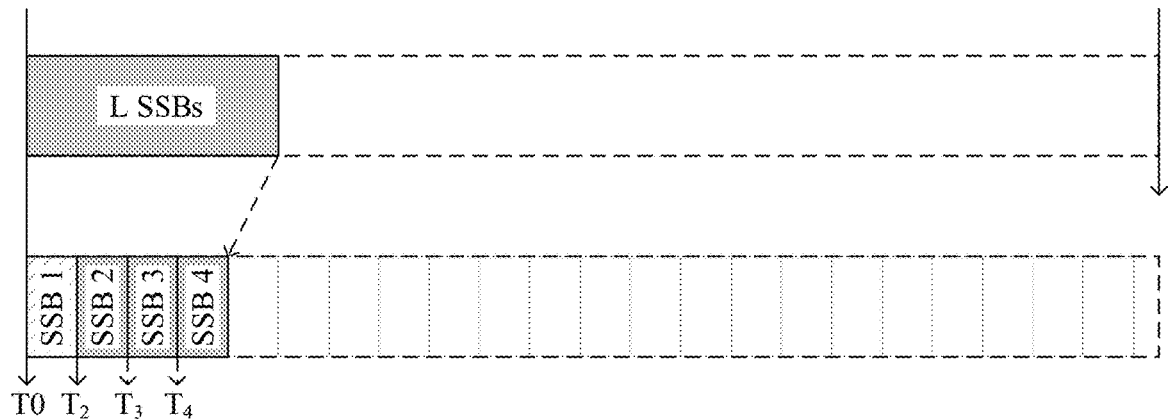
FIG. 5 is a schematic diagram of sending a synchronization signal block according to another embodiment of this application.

For example, referring to FIG. 5, when the LBT fails before the start time T0 of the transmission window of the SS burst set, the network device does not send an SSB, and performs LBT again within delayed $T_S$, that is, performs LBT before a time $T_2$ for transmitting the SSB 2. When the LBT succeeds before the time $T_2$, the SSB 2 and two (1=L−2=2) SSBs following the SSB 2 are sent. When the LBT fails before the time T2 for transmitting the SSB 2, the network device does not send the SSB 2 and performs LBT again within delayed $T_S$, that is, performs LBT before a time $T_3$ for transmitting the SSB 3, to send the SSB 3 and one (1=L−3=1) SSB following the SSB 3. The rest is deduced by analogy until all LBT before times for transmitting the L SSBs fails or the remaining SSBs in the L SSBs are successfully sent.

In one embodiment, if all the LBT before the times for transmitting the L SSBs fails, refer to the manner provided in FIG. 4. The network device does not transmit the L SSBs currently, but waits and attempts to send the SSBs again within a next time window for transmitting the L SSBs.

In one embodiment, if all the LBT before the times for transmitting the L SSBs fails, the network device may continue to attempt to transmit the SSB 1 in a transmission cycle window (20 ms) of the current synchronization signal burst set.

In another embodiment, a difference between this embodiment and the embodiment shown in FIG. 5 lies in that: After LBT succeeds before a time for transmitting the $(N+1)^{th}$ SSB, the network device sends all the L SSBs, that is, continues to perform transmission starting from the first SSB. The rest is deduced by analogy until all LBT before times for transmitting the L SSBs fails or the L SSBs are successfully sent.

It is assumed that a time length for transmitting one SSB is $T_S$. When the network device fails in the LBT before the start time T0 for the SS burst set transmission window, the network device delays $T_S$ to perform LBT again, that is, performs LBT before a time T0+$T_S$. When the LBT succeeds before the time T0+$T_S$, the network device sends the first SSB at the time T0+$T_S$ and sequentially sends the L SSBs. When the network device fails in the LBT before the time T0+$T_S$, the network device continues to delay $T_S$ to perform LBT again, that is, performs LBT before a time T0+2×$T_S$. When the LBT before the time T0+2×$T_S$ succeeds, the network device sends the first SSB at the time T0+2×$T_S$, and sequentially sends the L SSBs. By analogy, a start time for attempting to transmit the SSBs may alternatively be T0+3×$T_S$ or T0+4×$T_S$.

Figure 6:
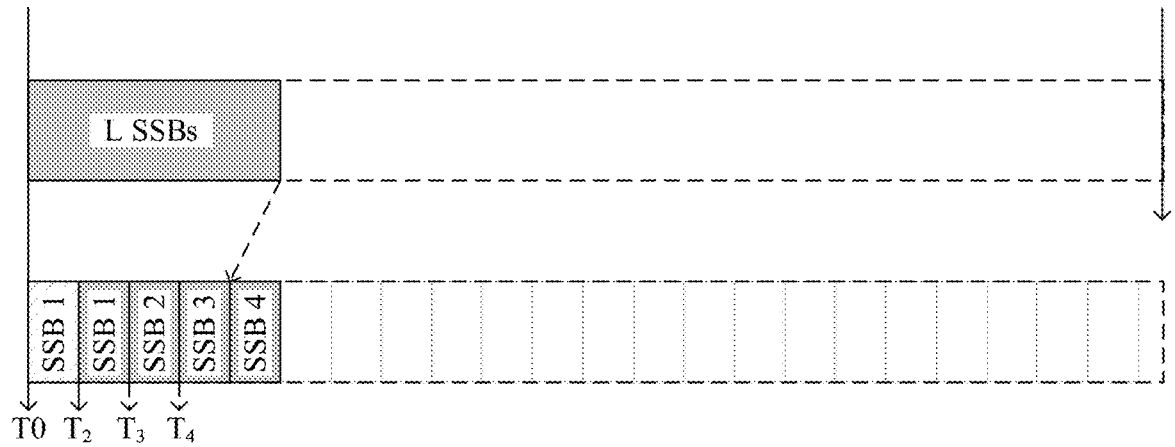
FIG. 6 is a schematic diagram of sending a synchronization signal block according to another embodiment of this application.

For example, referring to FIG. 6, when the LBT fails before the start time T0 of the transmission window of the SS burst set, the network device does not send an SSB, and performs LBT before a time T2 for transmitting the SSB 2. When the LBT succeeds before the time $T_2$, the SSB 1 to the SSB 4 are sent. When the LBT fails before the time $T_2$, the network device does not send an SSB, and performs LBT before a time T3 for transmitting the SSB 3.

In another embodiment, a difference between this embodiment and the embodiment shown in FIG. 5 lies in that: After LBT succeeds before a time for transmitting the $(N+1)^{th}$ SSB, the network device sends a remaining part (a total of L−(N+1) SSB(s)) of the L SSBs, and after sending the remaining part of the L SSBs, continues to send the $N^{th}$ SSB that is not sent due to the LBT failure.

Figure 7:
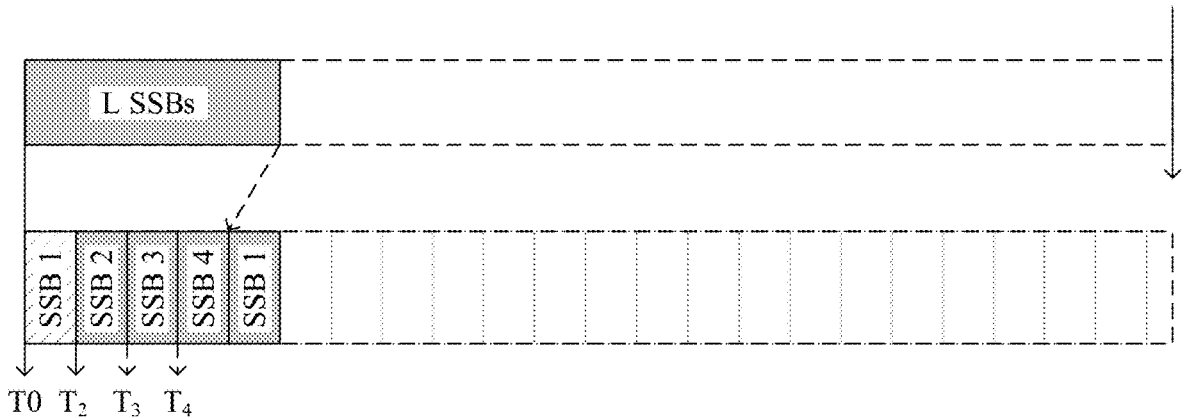
FIG. 7 is a schematic diagram of sending a synchronization signal block according to another embodiment of this application.

For example, referring to FIG. 7, when the LBT fails before the start time $T_0$ of the transmission window of the SS burst set, the network device does not send an SSB, and performs LBT before a time for transmitting the SSB 2. When the LBT succeeds before the time $T_2$, after sending the SSB 2 to the SSB 4, the network device continues to send the SSB 1. When the LBT fails before the time $T_2$, the network device does not send an SSB, and performs LBT before a time $T_3$ for transmitting the SSB 3.

Figure 8:
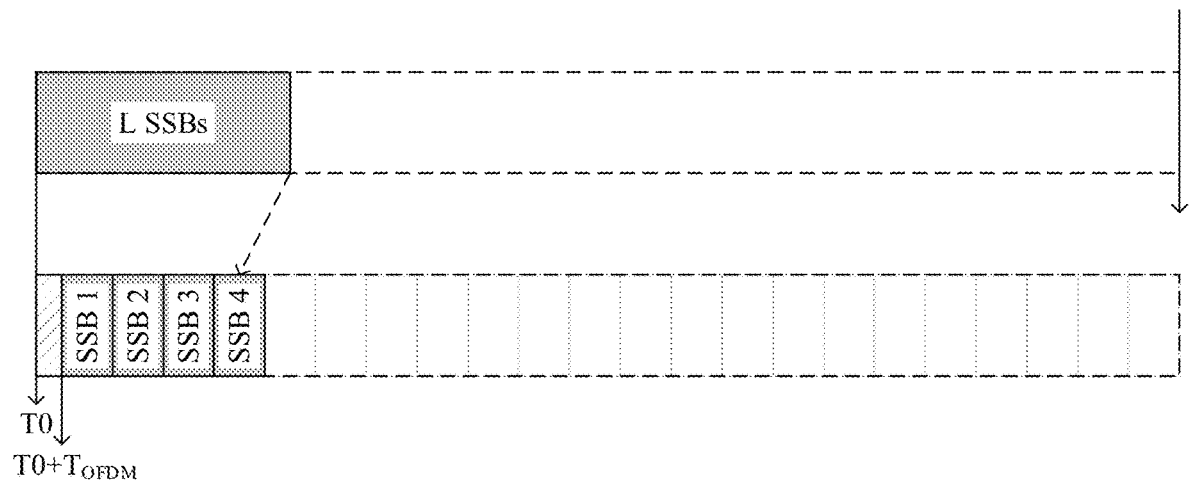
FIG. 8 is a schematic diagram of sending a synchronization signal block according to another embodiment of this application.

Referring to FIG. 8, in another embodiment, a granularity of the preset time length is a time length occupied by one OFDM symbol. When the network device fails in the LBT before the start time T0 of the transmission window of the SS burst set, in operation 302, the network device does not transmit an SSB at T0, but delays one OFDM symbol at the time T0 to perform LBT again. For ease of description, $T_{OFDM}$ is used to indicate a transmission time length of one OFDM symbol. In other words, a start time for attempting to transmit the SSBs again is set to T0+$T_{OFDM}$. When the LBT succeeds before the time T0+$T_{OFDM}$, the network device starts to transmit the SSBs at the time T0+$T_{OFDM}$. When the LBT fails before the time T0+$T_{OFDM}$, the network device delays one OFDM symbol at the time T0+$T_{OFDM}$ to attempt to transmit the SSBs again, that is, sets a start time for transmitting the SSBs to T0+2×$T_{OFDM}$. In this embodiment, after the LBT fails before a time, the network device delays one OFDM symbol to perform LBT. In other words, a granularity for performing LBT again by the network device is one OFDM symbol.

In another implementation, a granularity of the preset time length may alternatively be another transmission time interval (TTI) such as a slot (slot) or a mini slot (mini slot).

Figure 9:
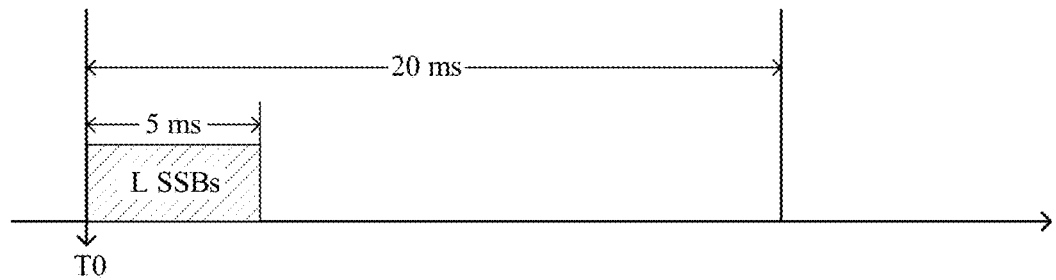
FIG. 9 is a schematic diagram of sending a synchronization signal block according to another embodiment of this application.

Referring to FIG. 9, in another embodiment, if the LBT fails before the start time T0 of the transmission window of the SS burst set, the network device does not send an SSB in the transmission window (for example, 20 ms) of the SS burst set, but waits and attempts to send the SSBs within a next transmission period window.

It should be noted that, in the embodiments of this application, when the LBT succeeds at a time, a time length of triggered channel occupancy time (COT) is greater than or equal to a time length required for transmitting the SS burst set, and the SS burst set may be transmitted within the COT. When the triggered COT is less than the time length required for transmitting the L SSBs, an SSB falling outside the COT cannot be transmitted until LBT is performed again and the COT is obtained.

In another embodiment, the SSB transmission manners shown in FIG. 4 to FIG. 8 may be predefined in a standard protocol in forms of transmission patterns (pattern), and the network device also sends the synchronization signal based on the transmission patterns. It may be understood that if only one of the transmission patterns is selected by default in the standard protocol, no indication is required. In some other embodiments, if the network device supports two or more of the foregoing transmission patterns, the network device needs to send indication information (for example, an indication bit), where the indication information is used to indicate a currently used transmission pattern to the user. For example, the indication information may be added to an SSB for sending. In addition, the indication information may also be dynamically indicated. In this way, in a system running process, a used transmission pattern may be dynamically adjusted based on a network status.

In addition, even if this solution is mainly applied to an unlicensed frequency band scenario, use of a transmission pattern of an SSB in a licensed frequency band is not excluded in this application, and the transmission pattern may be used as an optional transmission pattern.

The following describes, by using examples, types of LBT performed before the SSBs are transmitted in different embodiments.

Figure 10:
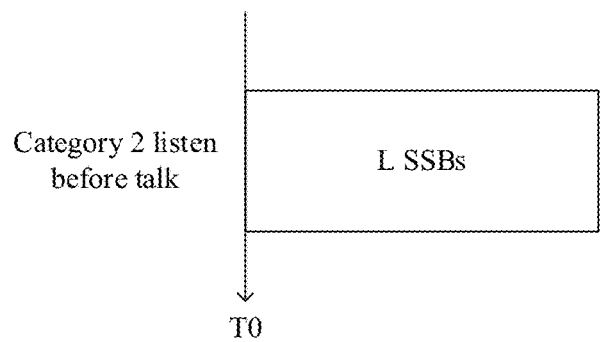
FIG. 10 is a schematic diagram of LBT according to an embodiment of this application.

For example, referring to FIG. 10, when the network device performs LBT to determine that the channel is idle and occupied COT only needs to transmit the SSBs, the network device may perform LBT that requires short-time listening and does not require backoff, for example, Cat2 LBT, or one-slot (One-slot) LBT.

Figure 11:
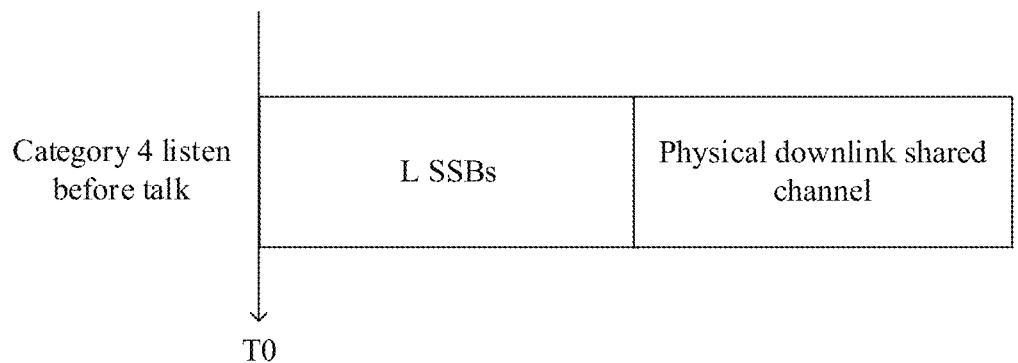
FIG. 11 is a schematic diagram of LBT according to another embodiment of this application.
Figure 12:
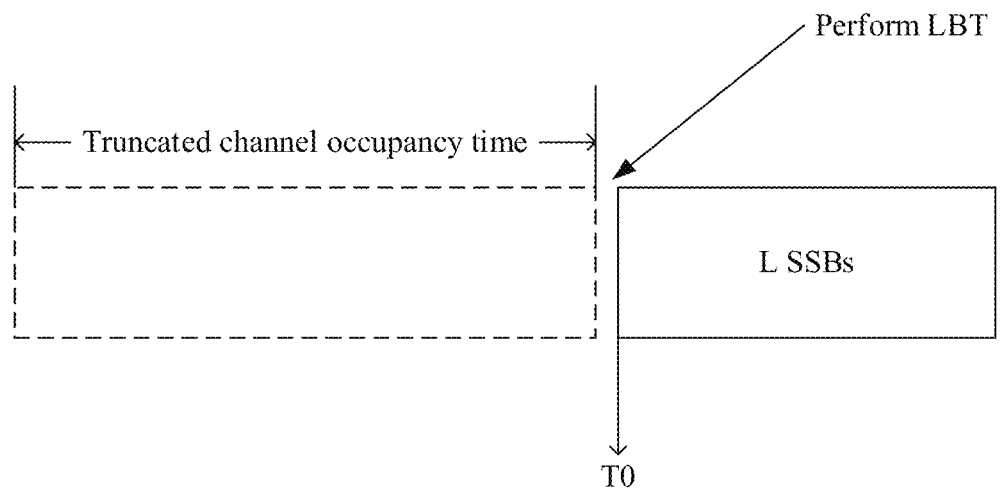
FIG. 12 is a schematic diagram of LBT according to another embodiment of this application.
Figure 13:
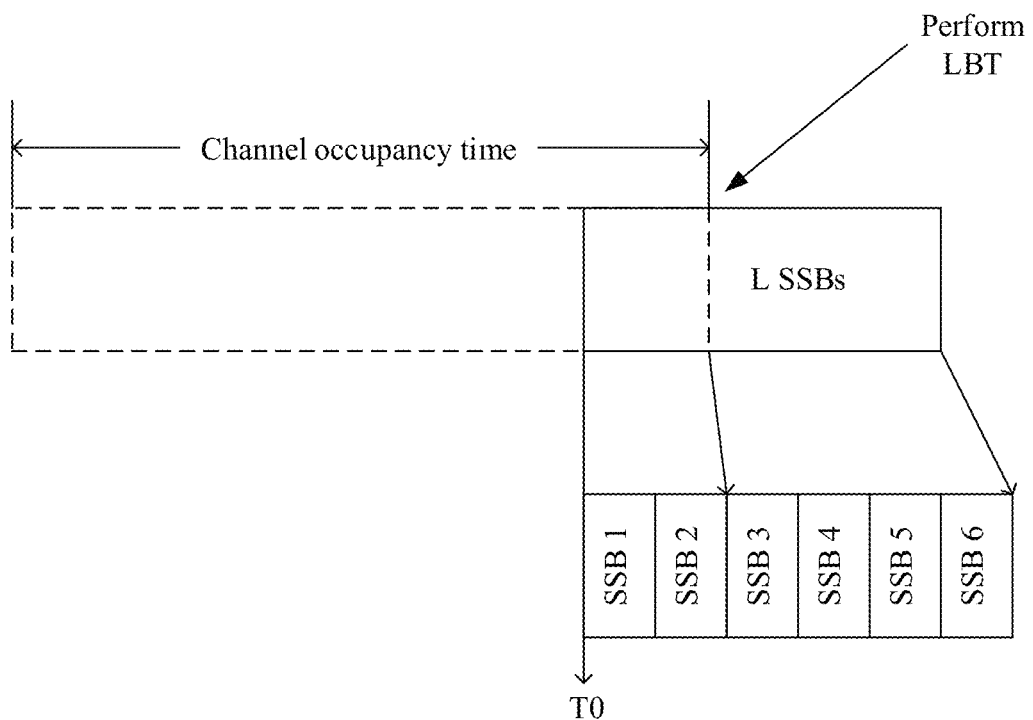
FIG. 13 is a schematic diagram of LBT according to another embodiment of this application.
Figure 14:
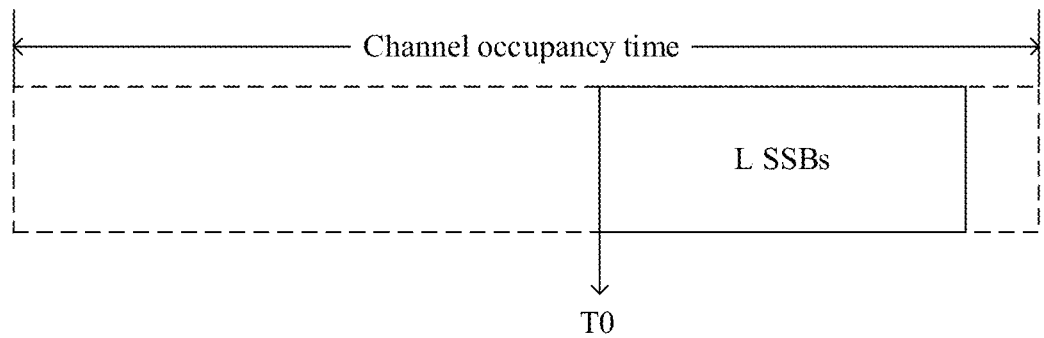
FIG. 14 is a schematic diagram of LBT according to another embodiment of this application.

For example, referring to FIG. 11, because the SSBs occupy only a part of bandwidth, remaining bandwidth may be used to transmit data. When the network device performs LBT to determine that the channel is idle, and occupied COT is used to transmit both the SSBs and data, for example, a physical downlink shared channel (PDSCH), the network device may perform long-time LBT that is that is based on listening and random backoff, for example, Category 4 listen before talk (Cat 4 LBT).

For example, before a transmission reference location (for example, T0) of the SSBs, when the network device has occupied one COT and remaining time is insufficient to transmit the L SSBs, there are two processing manners. For a processing manner, refer to FIG. 12. The network device truncates a current COT, and performs LBT before the transmission reference location of the SSBs. For another processing manner, refer to FIG. 13. The network device transmits an SSB falling within remaining time of the COT without performing LBT, and then transmits a remaining SSB after performing LBT.

Certainly, when COT occupied by the network device before the transmission reference location of the SSBs is sufficient to transmit the L SSBs, that is, the L SSBs exactly fall within the existing COT, the network device may directly send the L SSBs without performing LBT before the transmission reference location of the SSBs. For this case, refer to FIG. 14.

The foregoing describes in detail the embodiments of the method for transmitting a synchronization signal in this application. The following continues to describe embodiments of a network device and a terminal device in this application.

An implementation of the network device is first described. In a specific example, a structure of the network device includes a processor (or referred to as a controller) and a transceiver. In an example, the structure of the network device may further include a communications unit. The communications unit is configured to support communication with another network side device, such as communication with a core network node. In an example, the structure of the network device may further include a memory. The memory is coupled to the processor and is configured to store a program instruction and data that are necessary for the network device.

Figure 15:
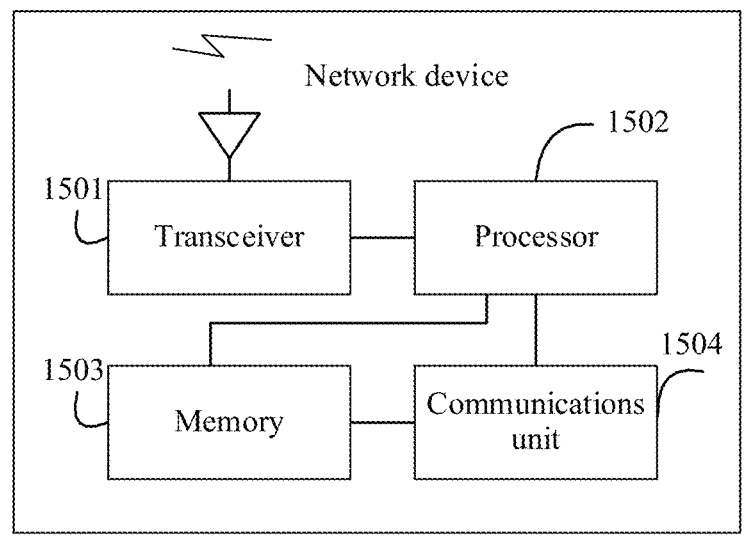
FIG. 15 is a simplified schematic diagram of a network device according to an embodiment of this application.

FIG. 15 is a simplified schematic structural diagram of the network device in the foregoing implementation. In an example corresponding to FIG. 15, a structure of the network device in this application includes a transceiver 1501, a processor 1502, a memory 1503, and a communications unit 1504. The transceiver 1501, the processor 1502, the memory 1503, and the communications unit 1504 are connected by using a bus.

On a downlink, to-be-sent data or signaling (including the foregoing downlink control information) is adjusted by the transceiver 1501 to provide an output sample and generate a downlink signal. The downlink signal is transmitted to the terminal device in the foregoing embodiment by using an antenna. On an uplink, the antenna receives an uplink signal transmitted by the terminal device in the foregoing embodiment. The receiver 1502 adjusts the signal received from the antenna, and provides an input sample. In the processor 1502, service data and a signaling message are processed, for example, modulating to-be-sent data and generating an SC-FDMA symbol. These units perform processing based on a radio access technology (for example, an access technology in LTE, 5G, and another evolved system) used by a radio access network. In an implementation shown in FIG. 15, the transceiver 1502 is integrated by a transmitter and a receiver. In another implementation, the transmitter and the receiver may alternatively be independent of each other.

The processor 1502 is further configured to control and management actions of the network device, to perform processing performed by the network device in the foregoing embodiments, for example, controlling the network device to process the SSBs and/or to perform another process of the technology described in this application. In an example, the processor 1502 is configured to support the network device in performing processing processes related to the network device in FIG. 2 to FIG. 14, for example, operation 301 in FIG. 3. When this solution is applied to an unlicensed scenario, the processor 1502 performs channel listening and obtains channel occupancy time through contention. For example, the processor 1502 performs channel listening based on the signal received by the transceiver 1501 from the antenna, and controls the transceiver to send a signal by using the antenna to occupy a channel. In different implementations, the processor 1502 may include one or more processors, for example, include one or more central processing units (CPU). The processor 1502 may be integrated into a chip, or may be a chip itself.

The memory 1503 is configured to store a related instruction and related data, and program code and data that are of the network device. In different implementations, the memory 1503 includes but is not limited to a random access memory (RAM), a read-only memory (ROM), an erasable programmable read-only memory (EPROM), or a portable read-only memory (CD-ROM).

It may be understood that FIG. 15 shows merely a simplified design of the network device. In actual application, the network device may include any quantities of transmitters, receivers, processors, memories, and the like. All network devices that can implement this application fall within the protection scope of this application.

The following describes an implementation of the terminal device. In a specific instance, a structure of the terminal device includes a processor (or referred to as a controller), a transceiver, and a modem processor. In an example, the structure of the network device may further include a memory. The memory is coupled to the processor and is configured to store a program instruction and data that are necessary for the network device.

Figure 16:
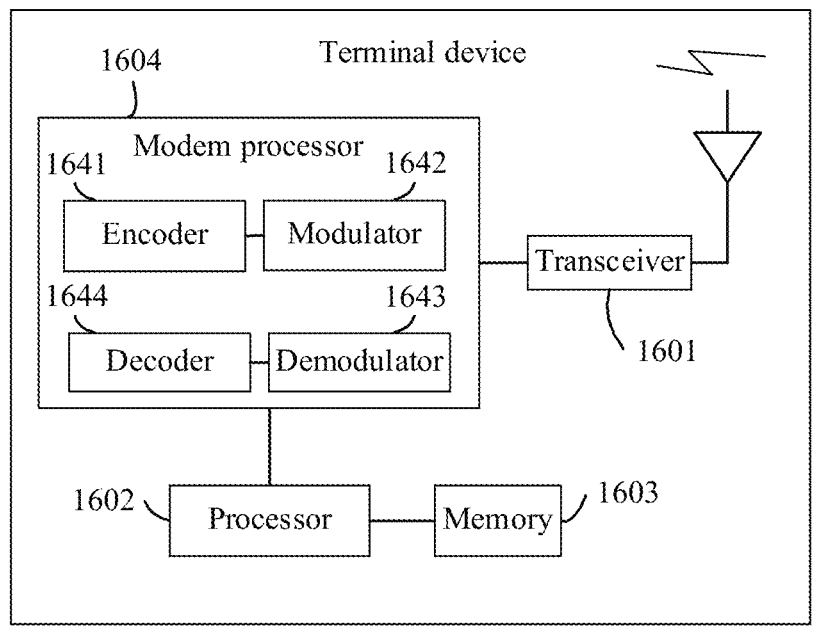
FIG. 16 is a simplified schematic diagram of a terminal device according to an embodiment of this application.

FIG. 16 is a schematic diagram of a simplified design structure of the terminal device in the foregoing embodiments. The terminal device includes a transceiver 1601, a processor 1602, a memory 1603, and a modem processor 1604. The transceiver 1601, the processor 1602, the memory 1603, and the modem processor 1604 are connected by using a bus.

The transceiver 1601 adjusts (for example, performs analog conversion, filtering, amplification, and up-conversion on) an output sample and generates an uplink signal. The uplink signal is transmitted to the network device in the foregoing embodiment by using an antenna. On a downlink, the antenna receives a downlink signal transmitted by the base station in the foregoing embodiments. The transceiver 160 adjusts (for example, performs filtering, amplification, down-conversion, and digitization on) the signal received from the antenna and provides an input sample. For example, in the modem processor 1604, an encoder 1641 receives service data and a signaling message that are to be sent on an uplink, and processes (for example, performs formatting, encoding, and interleaving on) the service data and the signaling message. The modulator 1642 further processes (for example, performs symbol mapping and modulation on) encoded service data and signaling message, and provides an output sample. The demodulator 1643 processes (for example, demodulates) the input sample and provides symbol estimation. A decoder 1644 processes (for example, de-interleaves and decodes) the symbol estimation and provides decoded data and a decoded signaling message that are to be sent to the terminal device. The encoder 1641, the modulator 1642, the demodulator 1643, and the decoder 1644 may be implemented by the combined modem processor 1604. These units perform processing based on a radio access technology (for example, an access technology in LTE, 5G, and another evolved system) used by a radio access network. In an implementation shown in FIG. 16, the transceiver 1601 is integrated by a transmitter and a receiver. In another implementation, the transmitter and the receiver may alternatively be independent of each other.

The processor 1602 controls and manages actions of the terminal device, and is configured to perform processing performed by the terminal device in the foregoing embodiments. For example, the processor 1602 is configured to control the terminal device to perform, based on received paging indication information, processing and/or another process of the technology described in this application. In an example, the processor 1602 is configured to support the terminal device in performing the processing processes related to the terminal device in FIG. 2 to FIG. 14. For example, the transceiver 1601 is configured to search for and receive, by using an antenna, a synchronization signal sent by a network device, and the processor 1602 is configured to obtain system information based on the synchronization signal. In different implementations, the processor 1602 may include one or more processors, for example, include one or more CPUs. The processor 1602 may be integrated into a chip, or may be a chip itself.

The memory 1603 is configured to store a related instruction and related data, and program code and data that are of the terminal device. In different implementations, the memory 703 includes but is not limited to a random access memory (RAM), a read-only memory (ROM), an erasable programmable read-only memory (EPROM), or a portable read-only memory (CD-ROM).

It may be understood that FIG. 16 shows merely a simplified design of the terminal device. In actual application, the terminal device may include any quantities of transmitters, receivers, processors, memories, and the like. All terminal devices that can implement this application fall within the protection scope of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer program instructions. When the computer program instruction is loaded and executed on a computer, the procedure or functions according to the embodiments of the present invention are all or partially generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disk (DVD)), a semiconductor medium (for example, a solid-state drive (SSD)), or the like.

A person skilled in the art should be aware that in the foregoing one or more examples, functions described in the embodiments of this application may be implemented by hardware, software, firmware, or any combination thereof. When the functions are implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

What is claimed is:

1. A method for sending a synchronization signal in an unlicensed frequency band, comprising:
    performing, by a network device, a listen before talk (LBT) operation before an expected start time $T_0$ for transmitting the synchronization signal, to determine whether a channel is busy or idle, wherein the synchronization signal comprises L synchronization signal blocks;
    in response to determining that the channel is busy, performing, by the network device, the LBT operation within a preset time length after the expected start time $T_0$, wherein the preset time length is at least one time length $T_L$ used for transmitting the L synchronization signal blocks, and wherein L is an integer greater than or equal to 2; and
    sending, by the network device, the synchronization signal after the preset time length after the expected start time $T_0$ when the channel is idle.

2. The method according to claim 1, wherein the performing, by the network device, of the LBT operation within the preset time length after the expected start time $T_0$ further comprises:
    performing, by the network device, the LBT operation within N $T_s$ after the expected start time $T_0$, wherein $T_s$ is a time length used for transmitting one synchronization signal block; and
    wherein the sending of the synchronization signal when the channel is idle further comprises:
    sending, by the network device, l synchronization signal blocks at a time $T0+N \times T_L$, wherein N is an integer greater than or equal to 1, l is less than or equal to L, and l is an integer greater than or equal to 1.

3. The method according to claim 1, wherein the preset time length is a time length $T_{OFDM}$ occupied by at least one orthogonal frequency division multiplexing (OFDM) symbol
    wherein the performing, by the network device, of the LBT operation within the preset time length after the expected start time $T_0$ further comprises:
    performing, by the network device, the LBT operation within M $T_{OFDM}$ after the expected start time $T_0$; and
    wherein the sending of the synchronization signal when the channel is idle further comprises:
    sending, by the network device, the synchronization signal at a time $T0+M \times T_{OFDM}$, wherein M is an integer greater than or equal to 1.

4. A network device, comprising:
    a processor; and
    a transceiver
    wherein the processor is configured to control the transceiver to perform a listen before talk (LBT) operation before an expected start time $T_0$ for transmitting a synchronization signal, to determine whether a channel is busy or idle, wherein the synchronization signal comprises L synchronization signal blocks; and
    wherein in response to determining that the channel is busy, the transceiver is configured to:
    perform the LBT operation within a preset time length after the expected start time $T_0$, wherein the preset time length is at least one time length $T_L$ used for transmitting the L synchronization signal blocks, and wherein L is an integer greater than or equal to 2, and send the synchronization signal after the preset time length after the expected start time $T_0$ when the channel is idle.

5. The network device according to claim 4, wherein the transceiver is configured to:
perform the LBT operation within N $T_s$ after the expected start time $T_0$, wherein $T_s$ is a time length used for transmitting one synchronization signal block (SSB); and
when the channel is idle, send l synchronization signal blocks at a time T0+N×$T_L$, wherein N is an integer greater than or equal to 1, l is less than or equal to L, and l is an integer greater than or equal to 1.

6. The network device according to claim 4, wherein the preset time length is a time length $T_{OFDM}$ occupied by at least one orthogonal frequency division multiplexing (OFDM) symbol;
wherein the transceiver is configured to:
perform the LBT operation in M $T_{OFDM}$ after the expected start time $T_0$, and when the channel is idle, send the synchronization signal at a time $T_0$+M×$T_{OFDM}$, wherein M is an integer greater than or equal to 1.

7. A non-transitory machine-readable medium having instructions stored therein, which when executed by a processor of a network device, causing the network device to perform operations for sending a synchronization signal in an unlicensed frequency band, the operations comprising:
performing a listen before talk (LBT) operation before an expected start time $T_0$ for transmitting the synchronization signal, to determine whether a channel is busy or idle, wherein the synchronization signal comprises L synchronization signal blocks;
in response to determining that the channel is busy, performing the LBT operation within a preset time length after the expected start time $T_0$, wherein the preset time length is at least one time length $T_L$ used for transmitting the L synchronization signal blocks, and wherein L is an integer greater than or equal to 2; and
sending the synchronization signal after the preset time length after the expected start time $T_0$ when the channel is idle.

8. The non-transitory machine-readable medium according to claim 7, wherein the performing of the LBT operation within the preset time length after the expected start time $T_0$ further comprises:
performing the LBT operation within N $T_s$ after the expected start time $T_0$, wherein $T_s$ is a time length used for transmitting one synchronization signal block; and
wherein the sending of the synchronization signal when the channel is idle further comprises:
sending l synchronization signal blocks at a time T0+N× $T_L$, wherein N is an integer greater than or equal to 1, l is less than or equal to L, and l is an integer greater than or equal to 1.

9. The non-transitory machine-readable medium according to claim 7, wherein the preset time length is a time length $T_{OFDM}$ occupied by at least one orthogonal frequency division multiplexing (OFDM) symbol;
wherein the performing of the LBT operation within the preset time length after the expected start time To further comprises:
performing the LBT operation within M $T_{OFDM}$ after the expected start time To; and
wherein the sending of the synchronization signal when the channel is idle further comprises:
sending the synchronization signal at a time T0+M× $T_{OFDM}$, wherein M is an integer greater than or equal to 1.

* * * * *